US008500039B2

(12) United States Patent
Allen, Jr.

(10) Patent No.: US 8,500,039 B2
(45) Date of Patent: Aug. 6, 2013

(54) REMOTE ACTUATION DEVICE FOR SPRAY CANS

(76) Inventor: Arthur L Allen, Jr., Statesboro, GA (US)

( * ) Notice: Subject to any disclaimer, the term of this patent is extended or adjusted under 35 U.S.C. 154(b) by 231 days.

(21) Appl. No.: 13/190,096

(22) Filed: Jul. 25, 2011

(65) Prior Publication Data

US 2013/0026400 A1   Jan. 31, 2013

(51) Int. Cl.
*A01G 27/00* (2006.01)

(52) U.S. Cl.
USPC ............................................. 239/67; 239/69

(58) Field of Classification Search
USPC ................. 239/67, 69, 562, 569; 222/174
See application file for complete search history.

(56) References Cited

U.S. PATENT DOCUMENTS

| 2,821,048 A | 1/1958 | Efford |
| 2,850,615 A | 9/1958 | Luse |
| 3,001,524 A | 9/1961 | Louis |
| 3,045,878 A | 7/1962 | Blanford |
| 3,069,095 A | 12/1962 | Bishop |
| 3,258,003 A | 6/1966 | Turner |
| 3,693,401 A | 9/1972 | Purt |
| 4,271,693 A | 6/1981 | Bute |
| 4,301,674 A | 11/1981 | Haines |
| 4,306,575 A | 12/1981 | Minozzi |
| 4,462,244 A | 7/1984 | Lee |
| 4,579,258 A | 4/1986 | Brown |
| 5,309,148 A | 5/1994 | Birk |
| 5,361,623 A | 11/1994 | Wantz |
| 5,607,020 A * | 3/1997 | Gebhardt ........................ 169/48 |
| 5,670,946 A | 9/1997 | Ellwood |
| 5,785,891 A | 7/1998 | Lim |
| 6,198,399 B1 | 3/2001 | Mattis |
| 7,587,926 B2 | 9/2009 | Ackerman |
| 7,686,193 B1 | 3/2010 | Gervais |
| 7,852,227 B2 | 12/2010 | Pepper |
| 7,878,258 B2 * | 2/2011 | Lindstrom et al. ............... 169/61 |
| 8,141,754 B2 * | 3/2012 | Conner et al. ................. 222/333 |

FOREIGN PATENT DOCUMENTS

| AU | 6369290 | 1/1992 |
| JP | 11195181 | 7/1999 |
| JP | 2003532244 | 10/2003 |
| JP | 2006024064 | 6/2005 |

(Continued)

OTHER PUBLICATIONS

Solo; Testfire—multi-stimulus detector tester, www.testfire.com.
Testfire; Testfire—multi-stimulus detector tester, www.testfire.com.

*Primary Examiner* — Davis Hwu
(74) *Attorney, Agent, or Firm* — David L King

(57) ABSTRACT

A remote spray nozzle actuating device for spray cans has a spray can holder assembly for holding a spray can, the further including a wireless activator assembly; and a wireless transmitter for remotely activating the wireless activator assembly causing the spray nozzle to be actuated. The spray can holder assembly further has a trigger. The trigger is connected to the wireless activator assembly wherein movement of the trigger actuates a spray nozzle. The wireless activator assembly has a wireless receiver; a power supply; a control circuit; and an actuator. The actuator is connected to the control circuit and wherein upon activating the wireless transmitter a signal is received in the receiver and transmitted to the control circuit to activate the actuator causing the trigger to move activating the nozzle of the held spray can. A remote spray nozzle actuating device for spray cans wherein the device holds a spray can and the held spray can contains one of the following, paint, insecticide, smoke or simulated smoke.

11 Claims, 2 Drawing Sheets

FOREIGN PATENT DOCUMENTS

| WO | 9200240 | 1/1992 |
| WO | 2004085076 | 10/2004 |
| WO | 2007138329 | 12/2007 |
| WO | 2008111895 | 9/2008 |

\* cited by examiner

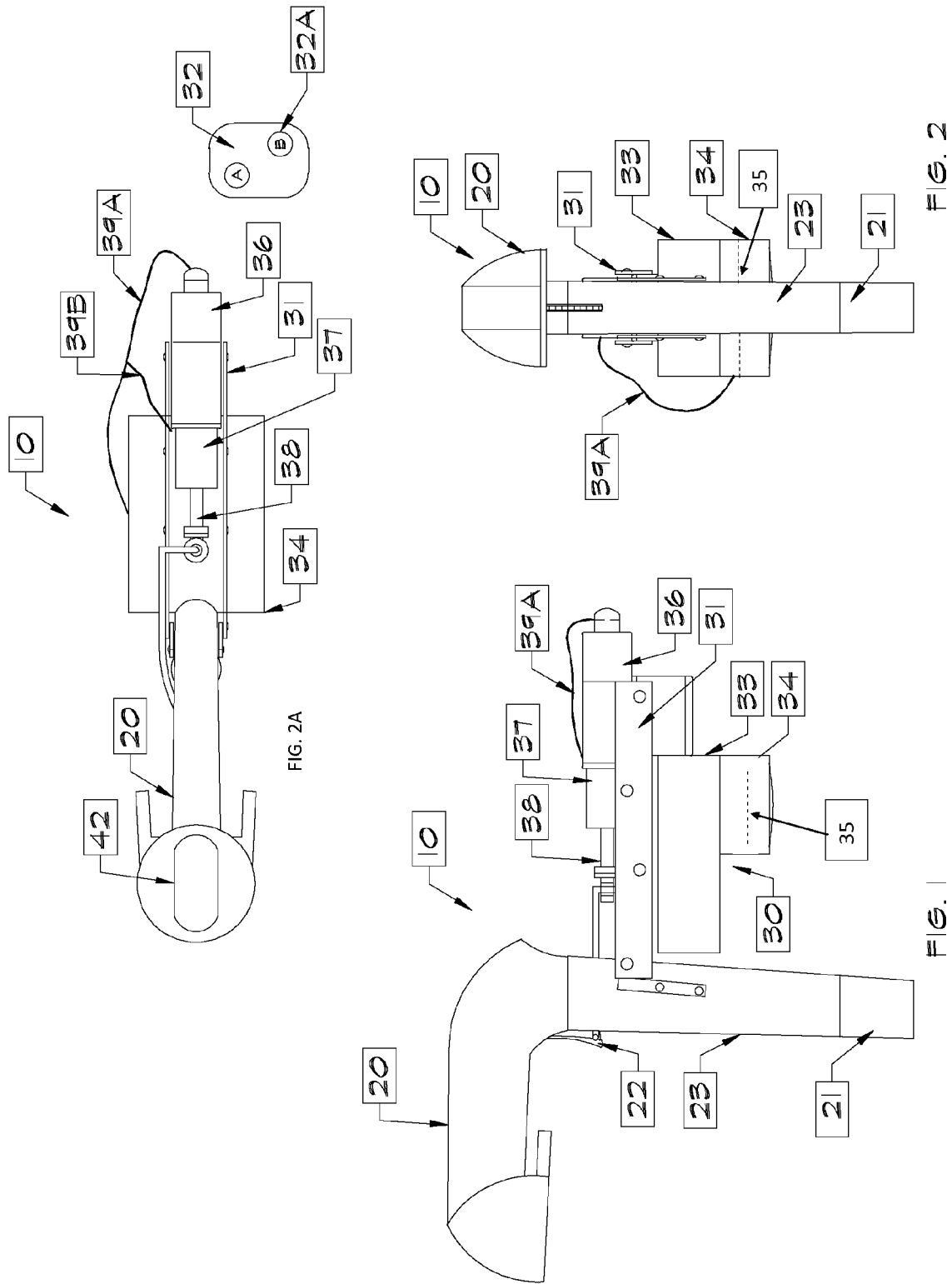

REMOTE ACTUATION DEVICE FOR SPRAY CANS

TECHNICAL FIELD

The present invention relates to a device for activating the nozzle of a can filled with a pressurized fluid or gas medium, more particularly to a device that can be actuated to remotely cause a spray can nozzle to be activated.

BACKGROUND OF THE INVENTION

Spray cans with a fluid under pressure are commonly used to spray paint, insect killer or any other common everyday substance. The spray is activated by depressing a nozzle to release an aerosol spray.

To facilitate the use of pressing the nozzle of such spray cans devices such as "Operating Handle for Aerosol Container", U.S. Pat. No. 4,579,258 have been patented. This handle enables the nozzle to be pressed by the handle device by squeezing a trigger which is much more comfortable to use. This is very important if the repeated or prolonged use of these spray cans is required.

In some smoke detector testing applications, a sprayer can be filled with a smoke simulation material and when the nozzle is depressed a mist or cloud of smoke is emitted. The smoke, if directed at a smoke detection device will cause the smoke detector to activate. This enables the smoke detector to be checked for functionality. Most electronic switches for testing a residential smoke detector actually verify the battery in the detector will function. Smoke simulators actually verify functionality of the smoke detector.

Several devices have been proposed to facilitate the use of smoke generating spray cans. In U.S. Pat. No. 5,361,623 entitled "Delivery System For Smoke Detector Testing Spray Formulation" shows a prior art delivery system is provided for use with an aerosol dispenser for delivering a formulation adapted to emulate the effects of combustion products to an electronic smoke detector for verifying operation of the detector. The device includes a nozzle attachment made of a tube having a diameter between approximately one-half inch and three inches and a length of at least twelve inches between an inlet end and an outlet end; and mounting means attached near the inlet end for supporting the tube to an aerosol spray dispenser with the proximal inlet opening in proximity with and aligned with a spray nozzle of the dispenser. The tube may be a cylindrical tube extending generally radially from the mounting ring, which is adapted to make a friction fit or a snap fit with the aerosol dispenser. The preferred dimensions of the delivery tube for general purpose testing of smoke detectors is a diameter of approximately one inch, and a length of at least eighteen inches between the inlet end opening and the outlet end opening. Still another benefit derived from the prior art delivery system was using an extension pole that has an actuating mechanism at the proximal end held by the user for remotely actuating the dispenser mounted to the distal end by means of a linkage extending along the pole. When such an extension device is used for bringing the dispenser into proximity to a ceiling mounted smoke detector, it is often difficult for the user to see in what direction the spray nozzle of the dispenser is pointing. This difficulty often results unnecessary waste of the test formulation before the detector is activated. This problem is largely overcome by fitting the dispenser with the delivery system which is plainly visible at heights of 20 or 30 feet so that the user can easily aim the discharge of the dispenser at the desired target.

This prior art device has several obvious disadvantages not the least of which is the elongated nozzle tube causes sprayed material to be wasted resulting in a costly expense as more spray cans are required. Secondarily, the use of an extension pole with a mechanical actuation linkage device is awkward to control and push or pull while trying to direct the spray.

These and other technical deficiencies are solved by the present invention which discloses a unique assembly that remotely can automatically activate a spray can nozzle for any number of purposes including a smoke detector tester, spraying wasps nests or even painting hard to reach places.

SUMMARY OF THE INVENTION

A remote spray nozzle actuating device for spray cans has a spray can holder assembly for holding a spray can, the assembly including a wireless activator assembly; and a wireless transmitter for remotely activating the wireless activator assembly causing the spray nozzle to be actuated. The spray can holder assembly further has a trigger. The trigger is connected to the wireless activator assembly wherein movement of the trigger actuates a spray nozzle. The spray can holder assembly has a female threaded coupling for attaching a handle extension having a corresponding male threaded end. The wireless activator assembly has a wireless receiver; a power supply; a control circuit; and an actuator. The actuator is connected to the control circuit and wherein upon activating the wireless transmitter a signal is received in the receiver and transmitted to the control circuit to activate the actuator causing the trigger to move activating the nozzle of the held spray can. A remote spray nozzle actuating device for spray cans wherein the device holds a spray can and the held spray can contains one of the following, paint, insecticide, smoke or simulated smoke. A remote spray nozzle actuating device for spray cans may be used as a smoke detector tester, a spray paint applicator or an insecticide sprayer for killing wasps, hornets or bees.

The remote spray nozzle actuating device for spray cans preferably includes a handle extension. The handle extension is a telescoping handle having changeable extension lengths. The wireless transmitter can be removeably attached to an end of the handle. The spray nozzle is activated as long as the wireless transmitter is activated by the user, and stops spraying on release or deactivation of the wireless transmitter.

DEFINITIONS

Activate: to make active, cause to function or act.
Actuate: to put into action, start a process, turn on.

BRIEF DESCRIPTION OF THE DRAWINGS

The invention will be described by way of example and with reference to the accompanying drawings in which:

FIG. 1 is a plan or side view of the remote spray nozzle actuating device made according to the present invention.

FIG. 2 is an end view of the device of the present invention.

FIG. 2A is a plan view of the device of the present invention.

DETAILED DESCRIPTION OF THE INVENTION

Figure 3:
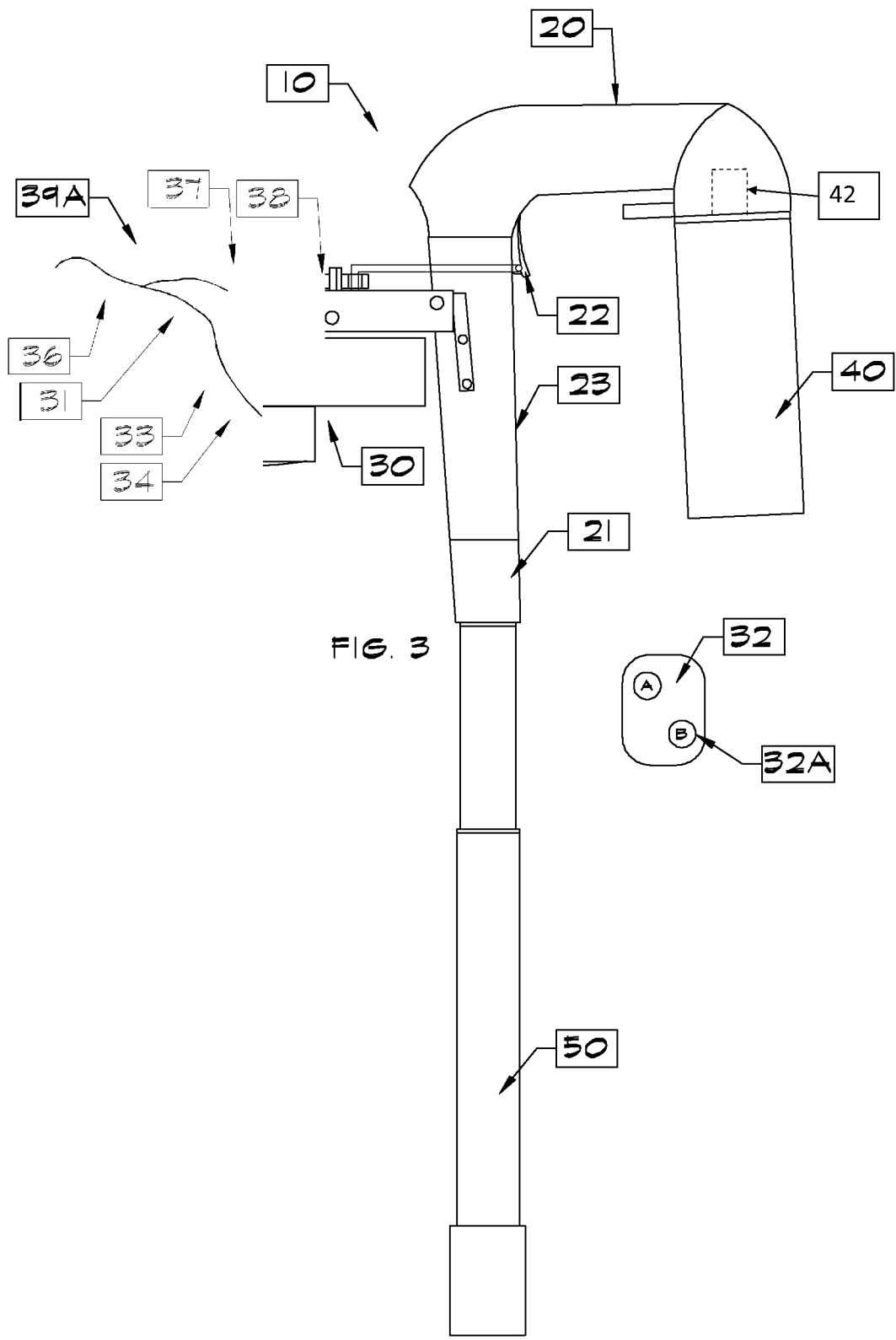
FIG. 3 is a view of the device of the present invention showing a spray can attached to the spray can holder assembly and a pole or handle extension attached to the device and a remote wireless transmitter lying next to the device.

With reference to FIGS. 1, 2, 2A and 3; the remote spray nozzle actuating device 10 is shown. As shown in FIG. 3, the device 10 has a spray can holder assembly 20 for holding a spray can 40. The device 10 includes a wireless activator assembly 30 and a wireless transmitter 32 for remotely activating the wireless activator assembly 30 causing the spray nozzle 42 to be actuated as illustrated in FIGS. 2A and 3.

With reference to FIG. 1, the spray can holder assembly 20 further has a trigger 22, the trigger 22 is connected to the wireless activator assembly 30 wherein movement of the trigger 22 actuates a spray nozzle 42 on a can 40. The wireless activator assembly 30 is shown attached to the spray can holder assembly 20. The activator assembly 30 includes a power supply 33, a wireless receiver 34, a control circuit 35 and an actuator 36.

As best seen in FIG. 3, the wireless receiver 34 is connected to the actuator 36. The actuator 36 comprises a cylinder 37 and piston 38 that moves linearly to push or pull on the trigger mechanism 22 of the spray can holder assembly 20. As shown, the power supply 33 is a battery pack 33 positioned below the bracket 31 holding the actuator 36 and the wireless receiver 34 is held under the battery pack 33 as illustrated. These components are electrically connected by the wiring harnesses 39A, 39B as shown.

As shown in FIG. 3, when a signal is transmitted from a wireless transmitter 32 the receiver 34 receives the signal and sends a signal through the control circuit 35 to activate the actuator 36 causing the trigger 22 to move which activates the nozzle 42 of the held spray can 40. Once the nozzle 42 is moved, the spray can 40 dispenses a mist or cloud of fluid or gases as required.

As further shown in FIG. 3, at a distal handle end 23 of the spray can holder assembly 20 is shown a threaded coupling 21 attached to the handle end 23. The threaded coupling 21 has female threads which enable it to receive a handle extension 50 having corresponding male threads. The handle extension 50 is shown in FIG. 3. The handle extension 50 may be a single handle component providing several feet of extension or could include a telescoping pole or handle having changeable extension lengths enabling the device 10 to be extended upwardly ten to twenty feet or more as required.

As shown in FIGS. 2A and 3, the wireless transmitter 32 is shown as a separate component from the remote spray nozzle actuating device 10. The wireless transmitter 32 can alternatively be clipped or otherwise fastened to the end of the handle or handle extension 50 of the device 10. The wireless transmitter 32 is held by a user and when a spray or mist is required the user simply depresses a button 32A on the transmitter 32 holding it down for as long as he wants the spray to be emitted. Once the user opts to stop spraying, he simply releases the button 32A on the wireless transmitter 32 and the actuator 36 will retract the piston 38 and the spray will be terminated. The remote spray actuating device 10 for spray cans as illustrated in FIG. 3 is shown holding an exemplary spray can 40. This spray can 40 can contain one of the following paint, insecticide, smoke or simulated smoke or any other combination of fluid or gas that needs to be put in a pressurized container with a spray nozzle 42. The device 10 can safely and conveniently spray from a distance into hard to reach places such as under the eaves when one is eradicating wasps, bees or hornets from their nesting places. The advantage of this device is that the operator holding the pole or handle extension 50 of the device 10 can either remotely activate using the wireless transmitter 32 or if so desired even have a third party hold the wireless transmitter 32 and upon a verbal signal indicating when he wants the spray to occur. The advantage of this is the user can be on the ground and not on a ladder when killing wasps, bees or hornets. This is particularly valuable in the fact that these insects tend to swarm and may attack anyone trying to eradicate them, as a result of this device 10 the user is positioned a relatively safe distance from the nest when he is effectively spraying into the nest and therefore being on the ground he can move rapidly away from the sprayed area should the insects attempt to attack him.

Currently there are cans available that can shoot a spray approximately 6-10 feet, the present invention enables these cans 40 to be used in conjunction with the pole or handle extension 50 providing an additional ten or twenty feet of distance between the user and the insects. This is particularly valuable in certain trees where hornets and wasps tend to nest in palm trees in the upper area in the upper fronds of the palms, these swarms can create a public nuisance and ideally are eradicated quickly and easily with the use of this device 10.

A second a very valuable use is the use of testing smoke detectors. Typically a smoke detector is positioned on the ceiling so that as the smoke rises it activates the smoke detector and an alarm is sounded. Most residential smoke detectors simply test the battery power and do not actually test the functionality of the detector. In many commercial and industrial applications, the actual ability of the detector to function when called upon is essential, accordingly an actual smoke simulation test must be conducted to verify functionality. In order to accomplish this, typically one has to climb up a ladder and spray a can of smoke directly at the detector. In some cases these detectors are positioned in hard to reach places or very high locations making it very difficult to accomplish this task. The present device 10 simplifies the entire activity and enables the tester to stand on the ground and remotely test the functionality of any smoke detector simply by pressing on the wireless transmitter 32 activating a signal then having the trigger 22 moved on the handle subassembly 20 such that it can move the nozzle 42 actuating the release of the aerosol spray of smoke or simulated smoke.

A third and also useful application of the present device 10 is as a paint sprayer. In this application a can 40 of paint held under pressure can be used with the device 10 and can be used to spray paint locations that are hard to reach. While there are many airless sprayers available with battery packs they require the operator to move along with the sprayer to conduct the necessary painting, additionally these sprayers include a pump and motor to provide the paint under pressurized condition. Spray cans originally invented for painting were a great facilitator in enabling painting areas that are very hard to reach. Ideally the use of the spray can 40 can be enhanced in that it enables the operator to stay on the ground in most cases and to reach in painting locations that otherwise would be unable to reach. As shown the device has a female threaded coupling 21 that preferably uses the handle of the paint pole extender 50 that is commonly found on devices such as roller handles. Paint roller handles come with a female coupling end, by duplicating this female coupling end a wide range of very low cost pole or handle extensions 50 can be used with the present invention. The attachment is quite simple and greatly facilitates the ability of the user to extend the distance to which he can reach with the device 10.

While the device 10 is shown with the components as illustrated, it is understood that these can be miniaturized greatly and the entire device 10 concealed in a body housing that would conceal the transmitter, battery pack and actuator if so desired. As shown, the present invention simply shows the basic components that are used to cause the functionality of the device 10 enabling it to actuate the trigger 22 on the can holder assembly 20 to actuate the nozzle 42 of the spray can 40. It is contemplated the present device 10 will be packaged in a smaller, lighter weight design, but with all the functionality provided in the present invention, as such the cost and the weight of the device 10 will be reduced dramatically upon mass production.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described, which will be within the full intended scope of the invention as defined by the following appended claims.

What is claimed is:

1. A remote spray nozzle actuating device for spray cans comprises:
   a spray can holder assembly for holding a spray can, the assembly including a wireless activator assembly and a trigger, the trigger being connected to the wireless activator assembly wherein movement of the trigger actuates a spray nozzle on a spray can held in the assembly;
   a wireless transmitter for remotely activating the wireless activator assembly causing the spray nozzle to be actuated; and
   wherein the spray can holder assembly has a coupling at a distal handle end for attachment to a pole or handle extension wherein the device including a spray can held in the holder assembly on the remote spray can holder assembly when attached to the pole or handle extension can direct a spray by an operator holding the pole or handle extension with the device attached at an end by actuating the wireless transmitter.

2. The remote spray nozzle actuating device for spray cans of claim 1 wherein the wireless activator assembly further comprises:
   a wireless receiver;
   a power supply;
   a control circuit; and
   an actuator, the actuator being connected to the control circuit and wherein upon activating the wireless transmitter a signal is received in the receiver and transmitted to the control circuit to activate the actuator causing the trigger to move activating the nozzle of the held spray can.

3. The remote spray nozzle actuating device for spray cans of claim 1 wherein the spray can holder assembly has a female threaded coupling for attaching a handle extension having a corresponding male threaded end.

4. The remote spray nozzle actuating device for spray cans of claim 3 further comprises a handle extension.

5. The remote spray nozzle actuating device for spray cans of claim 4 wherein the handle extension is a telescoping handle having changeable extension lengths.

6. The remote spray nozzle actuating device for spray cans of claim 4 wherein the wireless transmitter is removeably attached to an end of the handle extension.

7. The remote spray nozzle actuating device for spray cans of claim 1 wherein the spray nozzle is activated as long as the wireless transmitter is activated by the user, and stops spraying on release or deactivation of the wireless transmitter.

8. The remote spray nozzle actuating device for spray cans of claim 1 wherein the device further comprises a held spray can and the held spray can contains one of the following, paint, insecticide, smoke or simulated smoke.

9. The remote spray nozzle actuating device for spray cans of claim 1 wherein the device is a smoke detector tester.

10. The remote spray nozzle actuating device for spray cans of claim 1 wherein the device is a spray paint applicator.

11. The remote spray nozzle actuating device for spray cans of claim 1 wherein the device is an insecticide sprayer for killing wasps, hornets or bees.

* * * * *